(12) United States Patent
Park et al.

(10) Patent No.: US 10,324,252 B2
(45) Date of Patent: Jun. 18, 2019

(54) BACKLIGHT UNIT

(71) Applicant: LG DISPLAY CO., LTD., Seoul (KR)

(72) Inventors: Sang-Dae Park, Gyeonggi-do (KR); Eun-Ju Kim, Gyeonggi-do (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 15/855,347

(22) Filed: Dec. 27, 2017

(65) Prior Publication Data

US 2018/0120493 A1  May 3, 2018

Related U.S. Application Data

(62) Division of application No. 14/743,719, filed on Jun. 18, 2015, now Pat. No. 9,864,129, which is a division of application No. 13/726,733, filed on Dec. 26, 2012, now Pat. No. 9,099,018.

(30) Foreign Application Priority Data

Aug. 16, 2012  (KR) ................. 10-2012-0089627

(51) Int. Cl.
| F21V 7/04 | (2006.01) |
| F21V 8/00 | (2006.01) |
| G09F 13/04 | (2006.01) |
| G02F 1/1333 | (2006.01) |

(52) U.S. Cl.
CPC ............ G02B 6/009 (2013.01); G02B 6/0011 (2013.01); G02B 6/0085 (2013.01); G02B 6/0086 (2013.01); G09F 13/04 (2013.01); *G02F 2001/133314* (2013.01); *G02F 2001/133328* (2013.01)

(58) Field of Classification Search
CPC .... G02B 6/009; G02B 6/0086; G02B 6/0011; G02B 6/0085; G09F 13/04; G02F 2001/133314; G02F 2001/133328
See application file for complete search history.

(56) References Cited

U.S. PATENT DOCUMENTS

| 9,099,018 B2 | 8/2015 | Park |
| 9,864,129 B2 * | 1/2018 | Park ................. G09F 13/04 |
| 2006/0109616 A1 | 5/2006 | Lee et al. |

(Continued)

FOREIGN PATENT DOCUMENTS

| CN | 1662124 A | 8/2005 |
| CN | 101334538 A | 12/2008 |

(Continued)

OTHER PUBLICATIONS

Japanese Office Action dated Jan. 7, 2014 for cooresponding Japanese Patent Application No. 2012-281066.

(Continued)

*Primary Examiner* — Ali Alavi
(74) *Attorney, Agent, or Firm* — Morgan, Lewis & Bockius LLP

(57) ABSTRACT

Disclosed is a backlight unit. The backlight unit includes a light source, and a cover bottom internally accommodating the light source. Here, the cover bottom is divided into n-numbered (n>1) sub-cover bottoms, and a coupling unit for mutually fixing and coupling the divided cover bottoms is formed at ends of each of the cover bottoms facing each other.

7 Claims, 8 Drawing Sheets

(56) References Cited

U.S. PATENT DOCUMENTS

| | | | |
|---|---|---|---|
| 2008/0150427 A1* | 6/2008 | Uchida | H05K 7/20972 |
| | | | 313/582 |
| 2009/0002924 A1 | 1/2009 | Nakanishi et al. | |
| 2010/0172154 A1 | 7/2010 | Takeuchi et al. | |
| 2010/0195015 A1 | 8/2010 | Okitsu | |
| 2010/0208171 A1* | 8/2010 | Yamazaki | G02F 1/133603 |
| | | | 349/67 |
| 2011/0109830 A1* | 5/2011 | Wang | G02F 1/133608 |
| | | | 349/58 |
| 2011/0122349 A1* | 5/2011 | Amimoto | G02F 1/133604 |
| | | | 349/113 |
| 2011/0292315 A1 | 12/2011 | Bae et al. | |
| 2012/0014092 A1 | 1/2012 | Lee et al. | |
| 2012/0075829 A1 | 3/2012 | Li et al. | |

FOREIGN PATENT DOCUMENTS

| | | |
|---|---|---|
| CN | 101675378 A | 3/2010 |
| CN | 101680618 A | 3/2010 |
| JP | 2002-133935 A | 5/2002 |
| JP | 2007-199705 | 8/2007 |
| JP | 2009-020149 | 1/2009 |
| JP | 2009-042324 A | 2/2009 |
| JP | 2010-169906 A | 8/2010 |
| JP | 2010-170922 A | 8/2010 |
| JP | 2010-192285 A | 9/2010 |
| JP | 2011-112794 A | 6/2011 |
| JP | 2012-043793 A | 3/2012 |
| JP | 2012-054211 A | 3/2012 |
| JP | 2012-074704 A | 4/2012 |
| KR | 10-2006-0098887 | 9/2006 |
| KR | 10-2011-0130823 A | 12/2011 |

OTHER PUBLICATIONS

The First Office Action dated Mar. 18, 2018, from the State Intellectual Property Office of the People's Republic of China in counterpart Chinese application No. 2016-10019198.7.

Notice of Reason for Refusal dated Apr. 29, 2019, issued by the Korean Intellectual Property Office in counterpart Korean application No. 10-2012-0089627.

* cited by examiner

BACKLIGHT UNIT

This is a divisional application of copending application Ser. No. 14/743,719, filed on Jun. 18, 2015, which is a divisional application of application Ser. No. 13/726,733, filed on Dec. 26, 2012 (now U.S. Pat. No. 9,099,018), which claims the priority benefit of Korean Patent Application No. 10-2012-0089627 filed in the Republic of Korea on Aug. 16, 2012, all of which are hereby incorporated by reference in their entirety.

BACKGROUND

Field of the Disclosure

The present disclosure relates to a backlight unit that is used in a display device.

Discussion of the Related Art

A general liquid crystal display device 10 includes a liquid crystal panel 20 for outputting images, and a cover bottom 30 for receiving the liquid crystal panel 20 therein, as shown in FIG. 1.

On a rear surface of the cover bottom 30, a reinforcement frame 31 coupled to upper and lower portions, a reinforcing bar 22 for supporting the reinforcement frame 31, and a screw type of fixing member 33 for fixing and coupling the reinforcing bar 22 and the cover bottom 30 are positioned.

More specifically, the cover bottom 30 is manufactured in the form of a single sheet metal so as to correspond to a size (inch) of the liquid crystal panel 20, and the cover bottom 30 is laterally distorted due to thermal deformation occurring with respect to the reinforcing bar 22 by heat generated in a light source, thereby adversely affecting the mechanical life of the liquid crystal display device 10.

In addition, it is difficult to manufacture and mold the cover bottom in the form of a single sheet metal corresponding to a size of a liquid crystal panel which has been rapidly increasing.

In addition, along with the increase in the size of the cover bottom, a plurality of reinforcing bars should be provided on a rear surface of the cover bottom, resulting in an increase in manufacturing costs.

SUMMARY OF THE INVENTION

Accordingly, the present invention is directed to a backlight unit for a display device that substantially obviates one or more of the problems due to limitations and disadvantages of the related art.

An object of the present disclosure is to provide a backlight unit for a display device which may prevent thermal expansion and thermal deformation of the backlight unit affected by heat generated from a light source of a large display device, and include a cover bottom divided into a plurality of parts and joined to one so as to withstand external shocks.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described herein, a backlight unit includes: a light source; and a cover bottom internally accommodating the light source, wherein the cover bottom is divided into n-numbered (n>1) sub-cover bottoms, and a coupling unit for mutually fixing and coupling the divided sub-cover bottoms is formed at ends of each of the cover bottoms facing each other.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE PREFERRED EMBODIMENTS

Figure 1:
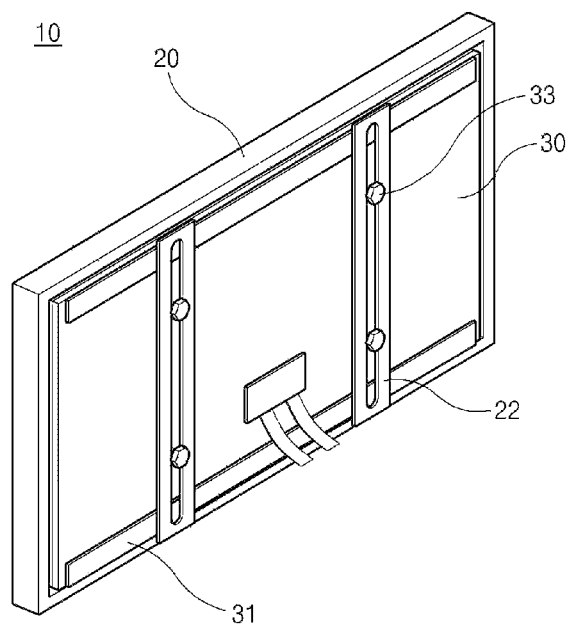
FIG. 1 is a perspective view showing a liquid crystal display device of the related art.

Example embodiments of the present invention are described below in sufficient detail to enable those of ordinary skill in the art to embody and practice the present invention. It is important to understand that the present invention may be embodied in many alternate forms and should not be construed as limited to the example embodiments set forth herein. It will be understood that, although the terms first, second, A, B, etc. may be used herein in reference to elements of the invention, such elements should not be construed as limited by these terms.

Hereinafter, preferred embodiments of the present invention will be described in more detail in reference with the accompanying drawings. Throughout the accompanying drawings, the same reference numerals are used to designate the same or similar components, and redundant descriptions thereof are omitted for easier overall understanding.

Figure 2:
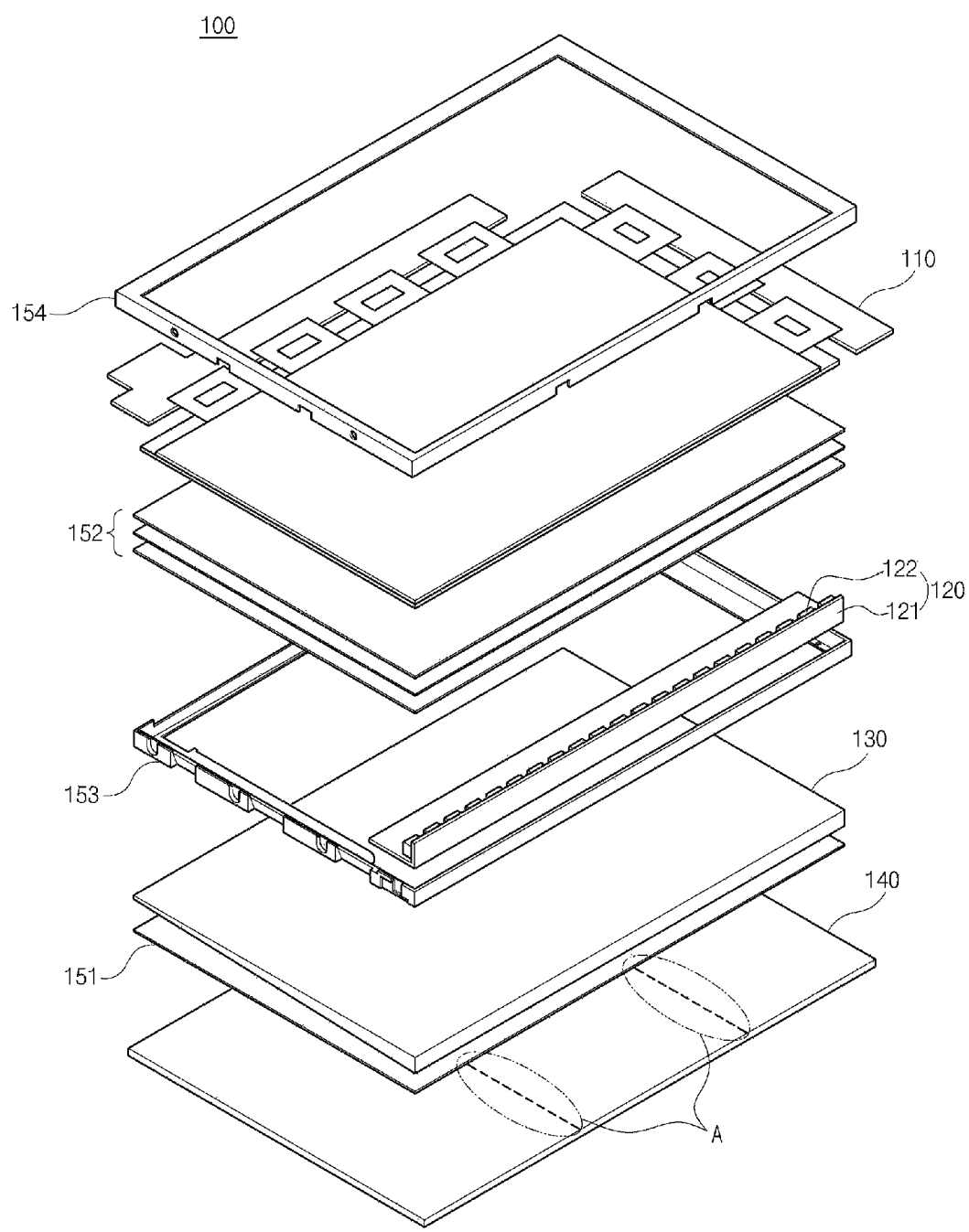
FIG. 2 is an exploded perspective view showing a display device according to an embodiment of the present invention.

FIG. 2 is an exploded perspective view showing a display device 100 according to an embodiment of the present invention. As shown in FIG. 2, the display device 100 includes a panel 110, a backlight unit, a guide panel 153, and a top case 154. Here, the backlight unit is composed of a light source 120, a light guide plate 130, a cover bottom 140, a reflecting sheet 151, and an optical sheet 152.

More specifically, the panel 110 may be composed of a liquid crystal panel in which a liquid crystal layer is formed between a color substrate and an array substrate so as to output images.

In addition, the light source 120 is positioned below the panel 110 so as to emit light to the panel 110, and is composed of an LED assembly in which a plurality of LEDs 122 are mounted on a printed circuit board 121.

The light guide plate 130 makes the light emitted from the LED 122 incident to the panel 110, and is preferably provided so as to face an emission direction of the LED 122.

In addition, the cover bottom 140 constituting the backlight unit is positioned below the light guide plate 130, and internally accommodates the panel 110 and the light source 120.

More specifically, the cover bottom 140 according to an embodiment of the present invention is divided into n-numbered (n>1, n being a natural number) cover bottoms.

In addition, in an A region of the cover bottom 140 shown in FIG. 2, a coupling unit for fixing and coupling ends of the cover bottoms facing each other is formed, and the coupling unit A will be described in further detail described below.

Both ends of the cover bottom coupled to the outermost angle of the cover bottom 140 are bent orthogonally to the direction of the panel 110, and therefore the cover bottom internally accommodates the light guide plate 130, the reflecting sheet 151, and the optical sheet 152.

The reflecting sheet 151 according to an embodiment of the present invention shown in FIG. 2 is positioned between the light guide plate 130 and the cover bottom 140, and re-reflects light leaked to the outside of the light guide plate 130, which cannot be propagated into the light guide plate 130, to a front surface of the panel 110.

The optical sheet 152 is positioned between the panel 110 and the light guide plate 130, and is composed of a prism sheet for condensing the light passing through the light guide plate 130 and a diffusion sheet for diffusing light.

In addition, the guide panel 153 guides the panel 110, and fixes the optical sheet 152.

The top case 154 covers edges of an upper surface of the panel 110, and is coupled to the cover bottom along a side border of the guide panel 153 and the cover bottom 140, and therefore the panel 110 and the backlight unit are integrated.

Figure 3:
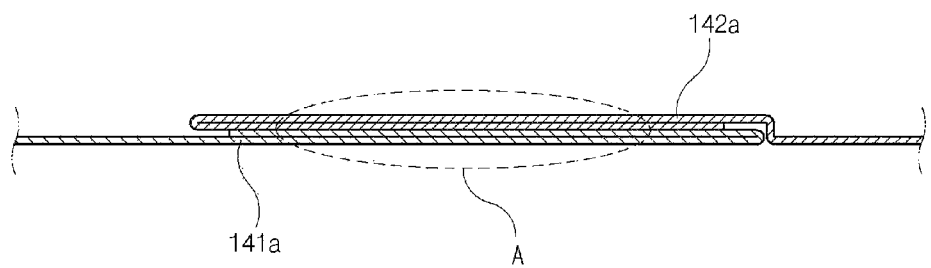
FIG. 3 is a sectional view showing a coupled cover bottom constituting a backlight unit according to a first embodiment of the present invention.

FIG. 3 is a sectional view showing a coupled cover bottom constituting a backlight unit according to a first embodiment of the present invention.

An example in which the cover bottom is divided into two will be described. As shown in FIG. 3, the cover bottom 140a is divided into a plurality of cover bottoms 141a and 142a, and a coupling unit A for fixing and coupling ends of the cover bottoms 141a and 142a is provided.

More specifically, according to the first embodiment, each of the first cover bottom 141a and the second cover bottom 142a positioned adjacent to the first cover bottom 141a includes a bent region in which ends of the first and second cover bottoms 141a and 142a are bent by 180 degrees so as to form a hemming structure by a hemming process.

Next, the second cover bottom 142a is laminated on the first cover bottom 141a.

In this manner, a total of four sheet metals of the cover bottom 140a constituting the coupling unit A may be laminated, and the number of laminated sheet metals may be variously changed depending on the number of times of the hemming process performed on the end of the cover bottom.

In addition, since the coupling unit A is formed in such a manner that multiple sheet metals of the divided cover bottoms are laminated, a thickness of the coupling unit A may be variously changed depending on the size of the panel, and therefore hardness of the cover bottom 140a constituting the backlight unit according to the present invention is improved compared to the cover bottom of the related art to which a reinforcing bar is coupled.

Accordingly, the coupling unit A may replace a plurality of reinforcing bars provided so as to maintain hardness of the cover bottom according to the related art, thereby reducing manufacturing costs.

When high heat generated from a plurality of LEDs 122 constituting the light source 120 is transmitted to the cover bottom 140a, the divided cover bottoms 141a and 142a may individually enable thermal expansion and thermal contraction.

Therefore, an amount of deformation is offset due to thermal deformation in the bent region constituting the coupling unit A, and therefore there is an effect of preventing distortion of the cover bottom 140a occurring due to heat.

Figure 4:
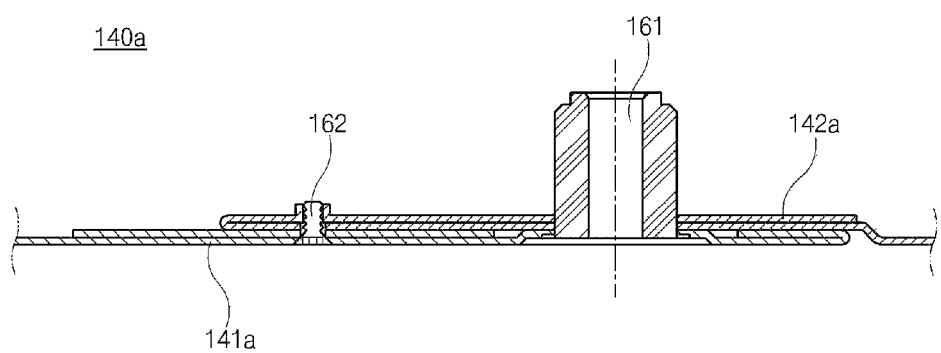
FIG. 4 is a sectional view showing a state in which an alignment member and a coupling member are coupled to a cover bottom shown in FIG. 3.

FIG. 4 is a sectional view showing a state in which an alignment member and a coupling member are coupled to a cover bottom shown in FIG. 3. As shown in FIG. 4, the coupling unit A further includes a plurality of alignment members 161 and a fastening member 162.

More specifically, the alignment member 161 acts as a PEM nut, and thereby passes through a laminated region of the first cover bottom 141a and the second cover bottom 142a so as to guide lamination of the divided cover bottoms 140a, and align the divided cover bottoms 140a.

In addition, the alignment member 161 may fix and couple the laminated cover bottoms 140a with each other in addition to guide the lamination of the first and second cover bottoms 141a and 142a, and align the first and second cover bottoms 141a and 142a.

The fastening member 162 may fix and couple the divided cover bottoms 140a with each other.

More specifically, as shown in FIG. 3, the screw type of fastening member 162 according to an embodiment of the present invention includes a thread formed on an outer circumferential surface thereof, and passes through the first cover bottom 141a and the second cover bottom 142a to fix and couple the first and second cover bottoms 141a and 142a.

In addition, the fastening member 162 may select and change a variety of means for fixing the cover bottom 140a which has been divided into the plurality of cover bottoms to be laminated.

Figure 5:
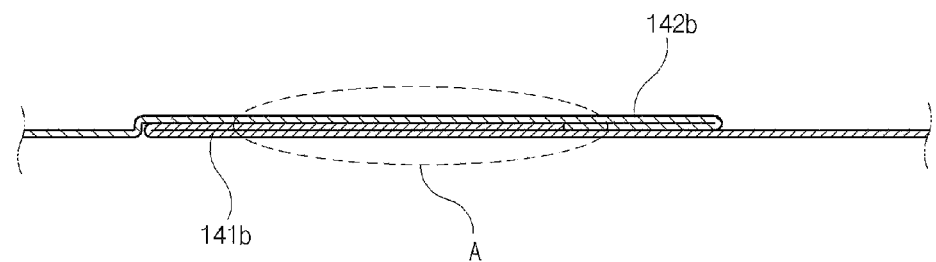
FIG. 5 is a sectional view showing a coupled cover bottom constituting a backlight unit according to a second embodiment of the present invention.

FIG. 5 is a sectional view showing a coupled cover bottom constituting a backlight unit according to a second embodiment of the present invention. In the following description of the second embodiment, the same components as or corresponding to those in the above-described first embodiment will be omitted. Hereinafter, with reference to FIG. 5, the cover bottom according to the second embodiment will be described.

A cover bottom 140b according to the second embodiment of the present invention is divided into a plurality of cover bottoms 141b and 142b, and ends of the divided cover bottoms 141b and 142b are fixed and coupled with each other to thereby constitute a coupling unit A.

More specifically, according to the second embodiment shown in FIG. 5, each of the first cover bottom 141b and the second cover bottom 142b positioned adjacent to the first cover bottom 141b includes a bent region in which ends of the first and second cover bottoms 141b and 142b are bent by 180 degrees so as to form a hemming structure by a hemming process.

Next, the second cover bottom 142b is laminated on the first cover bottom 141b to form the coupling unit A so that an end of the second cover bottom 142b faces an end of the first cover bottom 141b.

Accordingly, a total of three sheet metals of the cover bottom 140b constituting the coupling unit A may be laminated, and the number of laminated sheet metals may be variously changed depending on the number of times of the hemming process performed on the end of the cover bottom.

In addition, since the coupling unit A is formed in such a manner that multiple sheet metals of the divided cover bottoms are laminated, a thickness of the coupling unit A may be variously changed depending on the size of a panel, and therefore hardness of the cover bottom 140b constituting the backlight unit according to the present invention is improved compared to the cover bottom of the related art to which a reinforcing bar is coupled.

Accordingly, the coupling unit A may replace a plurality of reinforcing bars provided so as to maintain hardness of the cover bottom according to the related art, thereby reducing manufacturing costs.

When high heat generated from a plurality of LEDs 122 constituting the light source 120 is transmitted to the cover bottom 140b, the divided cover bottoms 141b and 142b may individually enable thermal expansion and thermal contraction.

Therefore, an amount of deformation is offset due to thermal deformation in the bent region constituting the coupling unit A, and therefore there is an effect of preventing distortion of the cover bottom 140b occurring due to heat.

In addition, although not shown, in the same manner as in the first embodiment shown in FIG. 4, a plurality of alignment members and fastening members may be coupled to the coupling unit A of the cover bottom 140b according to the second embodiment.

Figure 6:
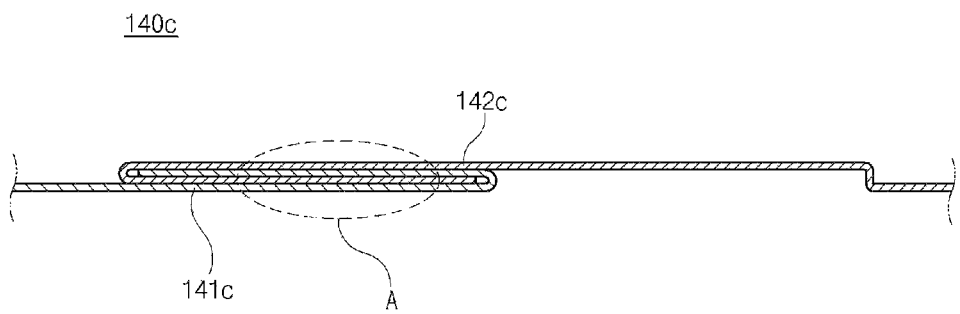
FIG. 6 is a sectional view showing a coupled cover bottom constituting a backlight unit according to a third embodiment of the present invention.
Figure 7A:
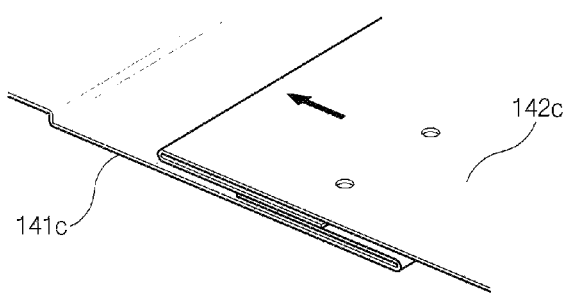
FIGS. 7A to 7C are perspective views showing a coupling process of the cover bottom shown in FIG. 6.
Figure 7B:
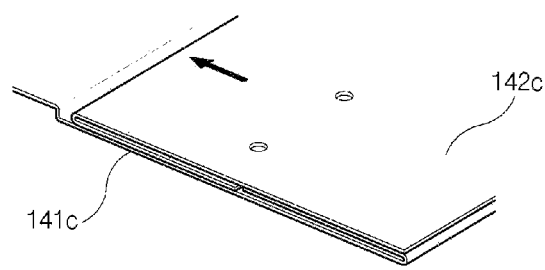
Figure 7C:
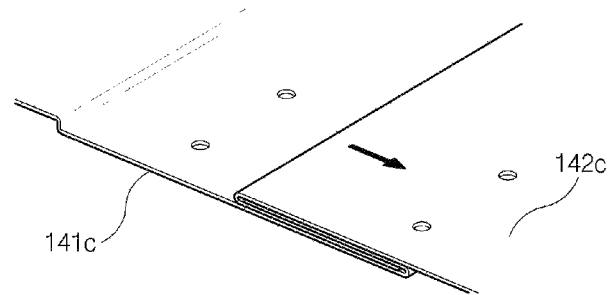

FIG. 6 is a sectional view showing a coupled cover bottom constituting a backlight unit according to a third embodiment of the present invention, and FIGS. 7A to 7C are perspective views showing a coupling process of the cover bottom shown in FIG. 6.

In the following description of the third embodiment, the same components as or corresponding to those in the above-described first and second embodiments will be omitted. Hereinafter, with reference to FIGS. 6 and 7A to 7C, the cover bottom according to the third embodiment will be described.

As shown in FIG. 6, a cover bottom 140c according to the third embodiment of the present invention is divided into a plurality of cover bottoms 141c and 142c, and ends of the divided cover bottoms 141c and 142c are fixed and coupled with each other to thereby constitute a coupling unit A.

More specifically, according to the third embodiment shown in FIG. 6, the first cover bottom 141c includes a bent region in which an end of the first cover bottom 141c is bent by 180 degrees so as to form a hemming structure by a hemming process, and a predetermined space may be formed in the bent region.

In addition, the second cover bottom 142c positioned adjacent to the first cover bottom 141c includes a bent region in which an end of the second cover bottom 142c is bent by 180 degrees so as to form a hemming structure by a hemming process, and a predetermined space may be formed in the bent region.

In order to insert the second cover bottom 142c into the space formed in the bent region of the first cover bottom 141c, as shown in FIG. 7A, the second cover bottom 142c is positioned on the first cover bottom 141c.

Next, as shown in FIG. 7B, the second cover bottom 142c is moved in a direction of an arrow, so that the predetermined space formed in the bent region of the first cover bottom 141c and the predetermined space formed in the bent region of the second cover bottom 142c face each other.

Next, as shown in FIG. 7C, the second cover bottom 142c is moved in a direction of an arrow, so that the second cover bottom 142c is slidably coupled to the predetermined space formed in the bent region of the first cover bottom 141c.

In addition, as shown in FIG. 7C, by pressuring, in a press process, a laminated region from below and above in a state in which sheet metals of the first cover bottom 141c and the second cover bottom 142c are alternately laminated, the coupling unit A for fixing and coupling the first cover bottom 141c and the second cover bottom 142c may be formed.

Therefore, a total of three sheet metals of the cover bottom 140c constituting the coupling unit A may be laminated, and the number of laminated sheet metals may be variously changed depending on the number of times of the hemming process performed on the end of the cover bottom.

According to the present embodiment, since the first cover bottom 141c and the second cover bottom 142c are hooked and coupled with each other, hardness of the cover bottom 140c constituting the backlight unit according to the present invention is improved compared to the cover bottom of the related art to which a reinforcing bar is coupled.

In addition, the coupling unit A may replace a plurality of reinforcing bars provided so as to maintain hardness of the cover bottom of the related art, thereby reducing manufacturing costs.

When high heat generated from a plurality of LEDs 122 constituting the light source 120 is transmitted to the cover bottom 140c, the divided cover bottoms 141c and 142c may individually enable thermal expansion and thermal contraction.

Therefore, an amount of deformation is offset due to thermal deformation in the bent region constituting the coupling unit A, and therefore there is an effect of preventing distortion of the cover bottom 140c occurring due to heat.

In addition, although not shown, in the same manner as in the first embodiment shown in FIG. 4, a plurality of alignment members and fastening members may be coupled to the coupling unit A of the cover bottom 140c according to the third embodiment.

Figure 8:
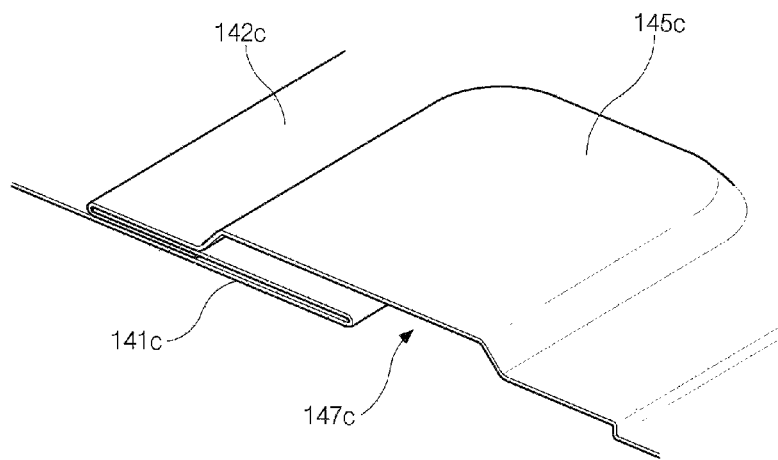
FIG. 8 is a perspective view showing a coupled cover bottom constituting a backlight unit according to a fourth embodiment of the present invention.

FIG. 8 is a perspective view showing a coupled cover bottom constituting a backlight unit according to a fourth embodiment of the present invention. In the following description of the fourth embodiment, the same components as or corresponding to those in the above-described embodiments will be omitted. Hereinafter, with reference to FIG. 8, the cover bottom according to the fourth embodiment will be described.

As shown in FIG. 8, the second cover bottom 142c may include a forming shape 145c in a region excluding a region where the second cover bottom 142c and the first cover bottom 141c are coupled with each other, using a forming method.

More specifically, in a structure of the cover bottom 140c, the forming shape 145c including a predetermined space 147c is formed on the uppermost sheet metal of a coupling unit A formed such that sheet metals of the first and second cover bottoms 141c and 142c are alternately laminated, and therefore hardness of the cover bottom 140c may be improved.

In addition, although not shown, in the same manner as in the first embodiment shown in FIG. 4, a plurality of alignment members and fastening members may be coupled to a laminated region of the cover bottom 140c according to the fourth embodiment.

Figure 9A:
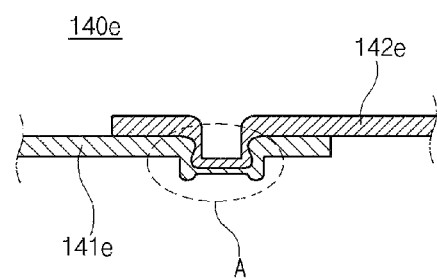
FIG. 9A is a perspective view showing a coupled cover bottom constituting a backlight unit according to a fifth embodiment of the present invention.
Figure 9B:
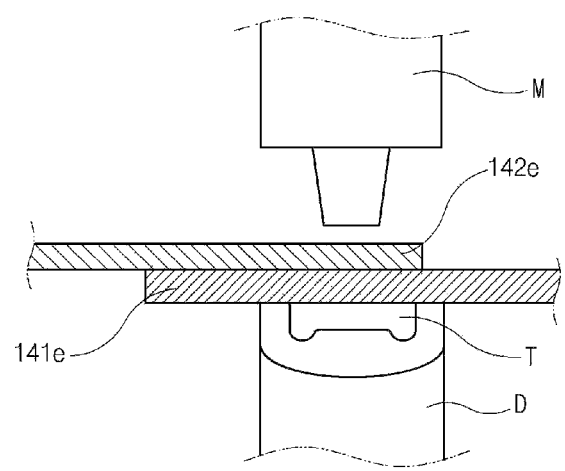
FIG. 9B is a sectional view showing a coupling process of a cover bottom constituting a backlight unit according to a fifth embodiment of the present invention.

FIG. 9A is a perspective view showing a coupled cover bottom constituting a backlight unit according to a fifth embodiment of the present invention, and FIG. 9B is a sectional view showing a coupling process of a cover bottom constituting a backlight unit according to a fifth embodiment of the present invention. In the following description of the fifth embodiment, the same components as or corresponding to those in the above-described embodiments will be omitted. Hereinafter, with reference to FIGS. 9A and 9B, the cover bottom according to the second embodiment will be described.

As shown in FIG. 9B, the first cover bottom 141e and the second cover bottom 142e are laminated in a predetermined region.

Next, the laminated region is positioned on a press die D including a tox (T) shape.

Next, a pressing process is performed using a press machine (M), and then a coupling unit A is formed on the laminated region of the cover bottom 140c, and therefore the first cover bottom 141e and the second cover bottom 142e are fixed and coupled with each other.

Accordingly, according the fifth embodiment of the present invention, the same alignment member and fastening member as in the first embodiment may not be provided in the coupling unit A of the cover bottom 140e.

Therefore, the coupling unit A according to the present embodiment may replace a plurality of reinforcing bars provided to maintain hardness of the cover bottom according to the related art, thereby reducing manufacturing costs.

Figure 10:
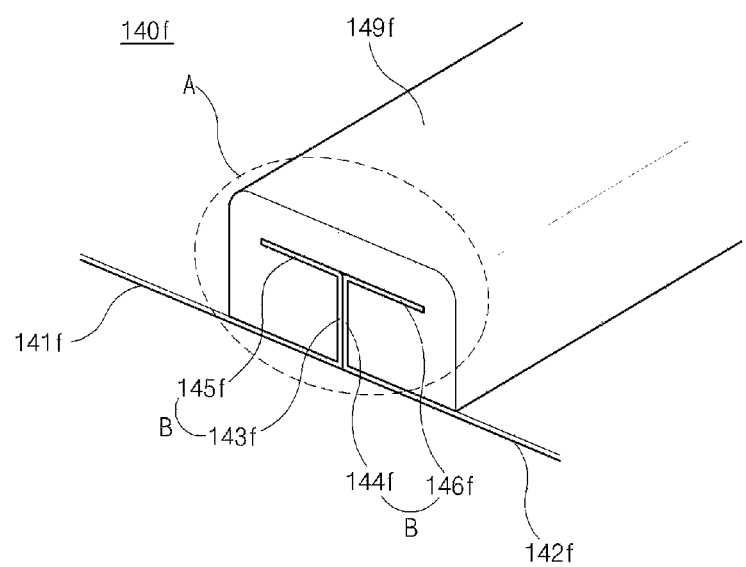
FIG. 10 is a perspective view showing a coupled cover bottom constituting a backlight unit according to a sixth embodiment of the present invention.

FIG. 10 is a perspective view showing a coupled cover bottom constituting a backlight unit according to a sixth embodiment of the present invention. In the following description of the sixth embodiment, the same components as or corresponding to those in the above-described embodiments will be omitted. Hereinafter, with reference to FIG. 10, the cover bottom according to the sixth embodiment will be described.

As shown in FIG. 10, it is preferable that a coupling unit A of a cover bottom 140f formed such that the cover bottom 140f is divided into a plurality of cover bottoms, and the divided cover bottoms are integrally coupled with each other be formed in a direction opposite to the liquid crystal panel 110.

More specifically, the coupling unit A includes a fixing member 149f that is slidably coupled with a plurality of bent portions B along an outer circumferential surface of the bent region B.

As shown in FIG. 10, the bent portion B formed at an end of a first cover bottom 141f includes a vertical portion 143f that is bent in the direction opposite to the liquid crystal panel, and an extended portion 145f that is extended from the vertical portion 143f and is horizontal with the first cover bottom 141f.

The bent portion B formed at an end of a second cover bottom 142f also includes a vertical portion 144f and an extended portion 146f so as to correspond to the bent portion B of the first cover bottom 141f.

In addition, as shown in FIG. 10, it is preferable that a bent angle between the bent portions B be perpendicular.

In addition, as shown in FIG. 10, the fixing member 149f is slidably coupled along an outer circumferential surface of the bent portion B, and therefore the first cover bottom 141f and the second cover bottom 142f are integrally fixed and coupled to each other.

Therefore, a coupling unit A according to the present embodiment may replace a plurality of reinforcing bars so as to maintain hardness of the cover bottom according to the related art, thereby reducing manufacturing costs.

When high heat generated from a plurality of LEDs 122 constituting the light source 120 is transmitted to the cover bottom 140f, the divided cover bottoms 141f and 142f may individually enable thermal expansion and thermal contraction.

Therefore, an amount of deformation is offset due to thermal deformation in the bent portion B constituting the coupling unit A, and therefore there is an effect of preventing distortion of the cover bottom 140f occurring due to heat.

In addition, according to the sixth embodiment of the present invention, since the fixing member 149f fixes and couples the first and second cover bottoms 141f and 142f, the cover bottom 140f may not additionally include an alignment member or a fastening member.

Figure 11:
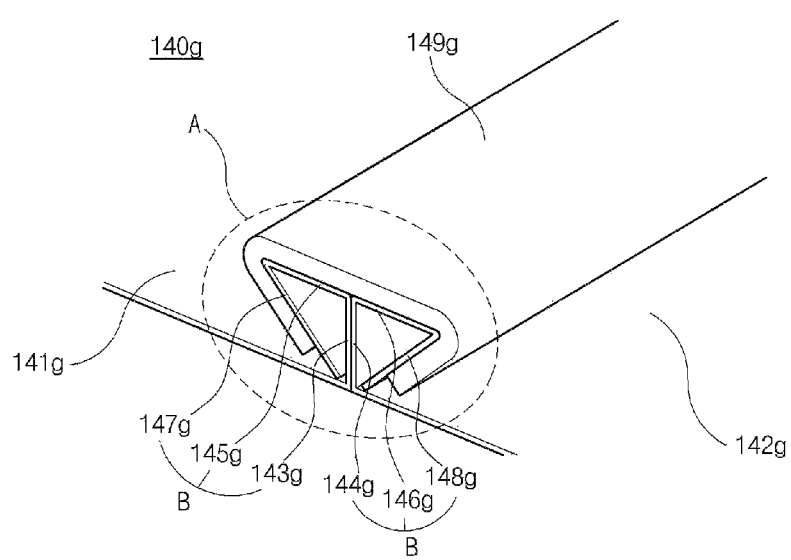
FIG. 11 is a perspective view showing a coupled cover bottom constituting a backlight unit according to a seventh embodiment of the present invention.

FIG. 11 is a perspective view showing a coupled cover bottom constituting a backlight unit according to a seventh embodiment of the present invention. In the following description of the seventh embodiment, the same components as or corresponding to those in the above-described embodiments will be omitted. Hereinafter, with reference to FIG. 11, the cover bottom according to the second embodiment will be described.

As shown in FIG. 11, compared to the coupling unit A of the cover bottom 140f according to the sixth embodiment, a bent that is bent in a direction of a cover bottom 140g may be further included.

More specifically, the coupling unit A includes a fixing member 149g that is slidably coupled to a plurality of bent portions B along an outer circumferential surface of the bent portion B.

As shown in FIG. 11, the bent portion B that is formed at an end of the first cover bottom 141g includes a vertical portion 143g, an extended portion 145g, and a bent 147g.

The vertical portion 143g is bent from an end of the first cover bottom 141g in a direction opposite to the liquid crystal panel 110.

In addition, the extended portion 145g is extended from the vertical portion 143g so as to be horizontal with the first cover bottom 141g.

The bent 147g is bent from an end of the extended portion 145g in a direction of the first cover bottom 141g.

Accordingly, a bent portion B formed at an end of the second cover bottom 142g also includes a vertical portion 144g, an extended portion 146g, and a bent 148g so as to correspond to the bent portion B of the first cover bottom 141g.

As shown in FIG. 11, a bent angle formed between the bent portions B may be variously formed.

More specifically, each angle between the vertical portions 143g and 144g and the extended portions 145g and 146g may be 90 degrees, and each angle between the extended portions 145g and 146g and the bents 147g and 148g may be 45 degrees or less.

In addition, as shown in FIG. 11, the fixing member 149g is slidably coupled along an outer circumferential surface of the bent portion B, and therefore the first cover bottom 141g and the second cover bottom 142g may be integrally fixed and coupled with each other.

Therefore, the coupling unit A according to the present embodiment may replace a plurality of reinforcing bars provided so as to maintain hardness of the cover bottom according to the related art, thereby reducing manufacturing costs.

When high heat generated from a plurality of LEDs 122 constituting the light source 120 is transmitted to the cover bottom 140g, the divided cover bottoms 141g and 142g may individually enable thermal expansion and thermal contraction.

Therefore, an amount of deformation is offset due to thermal deformation in the bent region B constituting the coupling unit A, and therefore there is an effect of preventing distortion of the cover bottom 140g occurring due to heat.

In addition, according to the seventh embodiment of the present embodiment, since the fixing member 149g fixes and couples the first and second cover bottoms 141g and 142g, the cover bottom 140g may not additionally include an alignment member or a fastening member.

Figure 12:
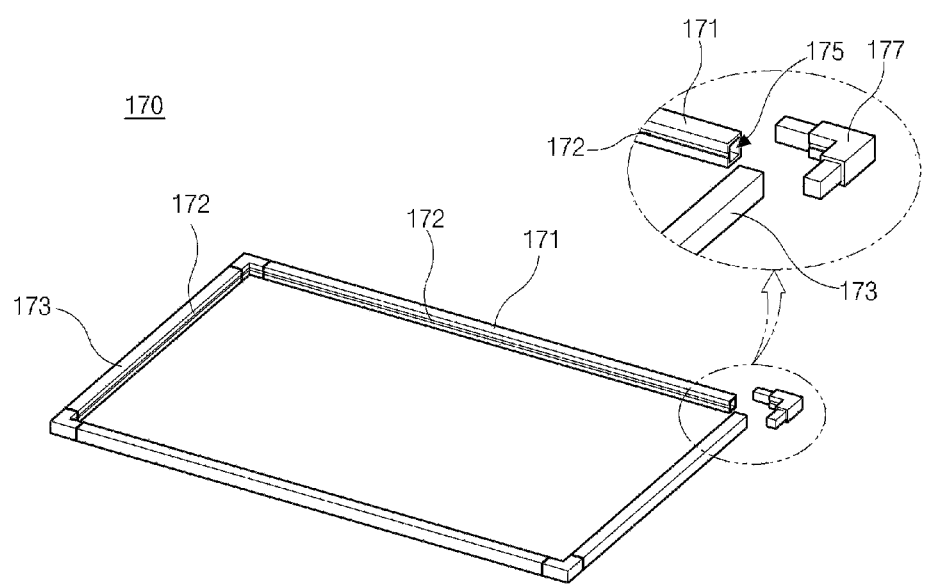
FIG. 12 is a perspective view showing a reinforcing member constituting a backlight unit according to an embodiment of the present invention.

FIG. 12 is a perspective view showing a reinforcing member 170 constituting a backlight unit according to an embodiment of the present invention.

As shown in FIG. 12, the reinforcing member 170 includes a first reinforcing portion 171, a second reinforcing portion 173, and a connection member 177, which may be commonly applied to the cover bottom according to the first to seventh embodiments of the present invention.

More specifically, as shown in FIG. 12, the first reinforcing portion 171 includes a coupling groove 172 formed on an inner surface thereof facing the cover bottom, and an opening 175 formed at ends of both sides thereof.

Accordingly, the first reinforcing portion 171 is coupled to the cover bottom along a length direction of the cover bottom to thereby support the length direction of the cover bottom.

In addition, in the same manner as in the first embodiment, the second reinforcing portion 173 includes a coupling groove 172 formed on an inner surface thereof facing the cover bottom, and an opening 175 formed at ends of the both sides thereof.

Accordingly, the second reinforcing portion 173 is coupled to the cover bottom along a width direction of the cover bottom to thereby support the width direction of the cover bottom.

A side surface of the cover bottom 140 of FIG. 2 is inserted into the coupling groove 172 of the first and second reinforcing portions 171 and 173.

The connection member 177 connects an end of the first reinforcing portion 171 and an end of the second reinforcing portion 173. Here, one end of the connection member 177 is inserted and fixed in the opening 175 of the first reinforcing portion 171, and the other end thereof is inserted and fixed in the opening 175 of the second reinforcing portion 173.

That is, the reinforcing member 170 according to the embodiments of the present invention is coupled to the cover bottom along a side border of the cover bottom 140 of FIG. 2 which has been divided into a plurality of cover bottoms and integrally coupled, thereby forming a vertical partition on an inclined surface of the cover bottom 140 of FIG. 2.

Therefore, the reinforcing member 170 is coupled to the cover bottom so as to cover the entire side border of the cover bottom 140, thereby preventing damage and deformation of the cover bottom 140 occurring due to external shocks.

In addition, when high heat generated from the light source 120 is transmitted to the cover bottom 140 so that expansion and contraction repeatedly occur over the entire surface of the cover bottom 140, the reinforcing member 170 supports the cover bottom 140 in the length direction and width direction of the cover bottom 140, thereby preventing distortion of the cover bottom 140 due to heat.

As described above, according to the embodiments of the present invention, the cover bottom constituting the backlight unit is formed in a division structure in which the cover bottom is divided into a plurality of cover bottoms, thereby preventing thermal expansion of the cover bottom due to heat generated from the light source, and thermal deformation due to the thermal expansion.

In addition, the cover bottom is formed in a division structure, and therefore hardness of the cover bottom is improved compared to the cover bottom of the related art including a reinforcing bar, thereby stably supporting a panel constituting a large display device, and protecting the display device from external shocks.

In addition, the coupling unit replaces a reinforcing bar provided on a bottom surface of a cover bottom of a liquid crystal display device according to the related art, thereby reducing manufacturing costs, and improving production yield.

In addition, compared to the cover bottom of the related art which is formed as a single sheet metal, the cover bottom according to the present invention has a division structure, and therefore extension is facilitated in response to the size of a panel which has been increasingly larger.

It will be apparent to those skilled in the art that various modifications and variations can be made in a backlight unit of the present disclosure without departing from the sprit or scope of the invention. Thus, it is intended that the present invention covers the modifications and variations of this invention provided they come within the scope of the appended claims and their equivalents.

What is claimed is:

1. A backlight unit comprising:
   a light source; and
   a cover bottom internally accommodating the light source,
   wherein the cover bottom is divided into n-numbered (n>1) sub-cover bottoms, and a coupling unit for mutually fixing and coupling the sub-cover bottoms is formed at ends of each of the sub-cover bottoms facing each other, and
   wherein the coupling unit includes a bent region formed such that an end of an n-th sub-cover bottom is bent, and a bent region formed such that an end of an (n+1)-th sub-cover bottom is bent, and the (n+1)-th bent region is internally hooked and coupled to the n-th bent region and the (n+1)-th sub-cover bottom is positioned on the n-th sub-cover bottom so that sheet metals of the n-th sub-cover bottom and the (n+1)-th sub-cover bottom are alternately laminated.

2. The backlight unit of claim 1, wherein a forming shape is formed on the uppermost sheet metal of a laminated region formed such that the sheet metals of the n-th sub-cover bottom and the (n+1)-th sub-cover bottom are alternately laminated.

3. The backlight unit of claim 1, wherein the bent region is composed of a hemming structure.

4. The backlight unit of claim 1, wherein the coupling unit further includes a plurality of alignment members passing through the laminated region so as to align the divided sub-cover bottoms, and a plurality of fastening members passing through the laminated region to be coupled with the divided sub-cover bottoms so as to fix and couple the divided sub-cover bottoms.

5. The backlight unit of claim 1, further comprising:
a light guide plate provided so as to face the light source;
a reflecting sheet positioned below the light guide plate and reflecting light leaked from the light guide plate;
an optical sheet positioned above the light guide plate and condensing and diffusing light passing through the light guide plate; and
a reinforcing member coupled to outer surfaces of the divided sub-cover bottoms and supporting the cover bottom,
wherein the light source is formed as an LED assembly in which a plurality of LEDs are mounted on a printed circuit board.

6. The backlight unit of claim 5, wherein the reinforcing member includes a first reinforcing portion including a coupling groove formed on an inner surface thereof and coupled along a length direction of the cover bottom to support the cover bottom, a second reinforcing portion including a coupling groove formed on an inner surface thereof and coupled along a width direction of the cover bottom to support the cover bottom, and a connection member connecting an end of the first reinforcing portion and an end of the second reinforcing portion.

7. The backlight unit of claim 6, wherein an opening is formed at both the ends of the first and second reinforcing portions, one end of the connection member is inserted and fixed in the opening of the first reinforcing portion, and the other end thereof is inserted and fixed in the opening of the second reinforcing portion.

* * * * *